United States Patent [19]

Kawanami et al.

[11] Patent Number: 4,544,999
[45] Date of Patent: Oct. 1, 1985

[54] MARKER LIGHT

[75] Inventors: Hisashi Kawanami; Kiyoshi Suzuki, both of Yokohama; Akihiro Kawauchi, Kawasaki, all of Japan

[73] Assignee: Toshiba Electric Equipment Corporation, Tokyo, Japan

[21] Appl. No.: 690,420

[22] Filed: Jan. 10, 1985

Related U.S. Application Data

[63] Continuation of Ser. No. 421,778, Sep. 23, 1982, abandoned.

[30] Foreign Application Priority Data

Sep. 30, 1981 [JP] Japan ................... 56-155302

[51] Int. Cl.⁴ ................. F21V 7/09; F21M 1/00
[52] U.S. Cl. .................... 362/298; 362/304; 362/346; 362/350; 340/815.15; 350/603
[58] Field of Search ........... 362/302, 304, 298, 34, 362/296, 297, 300, 305, 307, 311, 346, 347, 350, 277, 283, 280, 285, 289; 340/815.2, 815.15; 350/299, 300

[56] References Cited

U.S. PATENT DOCUMENTS

| | | | |
|---|---|---|---|
| 3,817 | 2/1870 | Schmidlin et al. | 362/346 |
| 231,601 | 9/1880 | Meigs | 362/346 |
| 701,295 | 6/1902 | Chaillet | 313/315 |
| 707,099 | 8/1902 | Gardner | 313/315 |
| 777,741 | 12/1904 | McDonnell | 313/315 |
| 1,413,379 | 4/1922 | Benard | 362/305 |
| 1,480,404 | 1/1924 | Halvorson | 362/305 |
| 3,026,408 | 3/1962 | Anderson et al. | 362/304 |
| 3,360,642 | 12/1967 | De Vos | 362/285 |
| 3,466,435 | 9/1969 | Brunner | 362/283 |
| 3,538,324 | 11/1970 | Hankins | 362/277 |
| 3,763,348 | 10/1973 | Costello | 350/296 |
| 4,408,266 | 10/1983 | Sclippa | 362/346 |

FOREIGN PATENT DOCUMENTS

| | | | |
|---|---|---|---|
| 2523714 | 5/1974 | Fed. Rep. of Germany | 362/285 |
| 293542 | 2/1932 | Italy | 362/304 |

Primary Examiner—Craig R. Feinberg
Assistant Examiner—David A. Okonsky
Attorney, Agent, or Firm—Oblon, Fisher, Spivak, McClelland & Maier

[57] ABSTRACT

A marker light comprising first and second reflectors each having a focus, a reflection surface of a quadric of rotation, an opening at the vertex end and a light projecting opening at the other end, the vertex ends of the reflectors facing each other and the focus of the first reflector being positioned closer to the light projecting opening of the first reflector than is the focus of the second reflector, a light source provided between the focuses of the first and second reflectors for emitting light, light from the light source being reflected from the first and second reflectors and supplied through the light projecting openings of the first and second reflectors, and a housing housing the first and second reflectors and the light source and having a first transparent section for passing light reflected from the first reflector and a second transparent section for passing light reflected from the second reflector, the first and second transparent sections being positioned to face the light projecting openings of the first and second reflectors, respectively.

9 Claims, 18 Drawing Figures

MARKER LIGHT

This application is a continuation of application Ser. No. 421,778, filed Sept. 23, 1982 now abandoned.

BACKGROUND OF THE INVENTION

This invention relates to a marker light for projecting the light from one light source in two different directions.

The marker light for projecting the light from one light source in two different directions is used, for example, as a runway edge light, a runway end and threshold light, or a taxiway edge light at airports. Specification of ICAO (International Civil Aviation Organization) requires that a marker light should provide a laterally-broadening, elliptic luminous distribution and the ratio of minimum luminous intensity and maximum luminous intensity in the distribution range thereof should not exceed 1:3. The invention was made based on the specification above.

SUMMARY OF THE INVENTION

An object of this invention is to provide a marker light which enables a sufficient uniformity of illuminance in two directions and satisfies the specification of the luminous intensity distribution.

In order to attain the object above, this marker light comprises first and second reflectors each having a focus, a reflection surface which is a quadric of revolution, an opening at the vertex end and a light projecting opening at the other end, the vertex ends of the reflectors facing each other and the focus of the first reflector being positioned closer to the light projecting opening of the first reflector than is the focus of the second reflector; a light source provided between the focuses of the first and second reflectors for emitting light, light from said light source being reflected from the first and second reflectors and supplied through the light projecting openings of the first and second reflectors; and a housing housing the first and second reflectors and the light source and having a first transparent section for passing light reflected from the first reflector and a second transparent section for passing light reflected from the second reflector, said first and second transparent sections being positioned to face the light projecting openings of the first and second reflectors, respectively.

Reflection surface of first and second reflectors may be formed on ellipsoid of revolution or paraboloid of revolution. An incandescent lamp with a flat filament is acceptable as a light source. An angle between a plane perpendicular to the flat surface of the filament and an optical axis of first and second reflectors may be not more than 10 degrees. The flat surface of the filament may be rectangular, elliptic or circular. HID (high intensity discharge) lamp may be used as a light source instead of an incandescent lamp.

BRIEF DESCRIPTION OF THE DRAWINGS

Other objects and advantages will become apparent from the following description taken in conjunction with the accompanying drawings, in which.

DETAILED DESCRIPTION OF THE PREFERRED EMBODIMENTS

Figure 1:
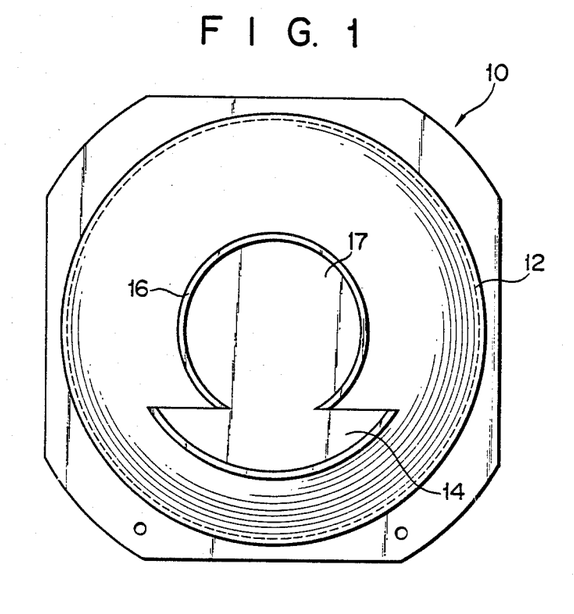
FIG. 1 shows a rear elevation of a reflector of this invention.
Figure 2:
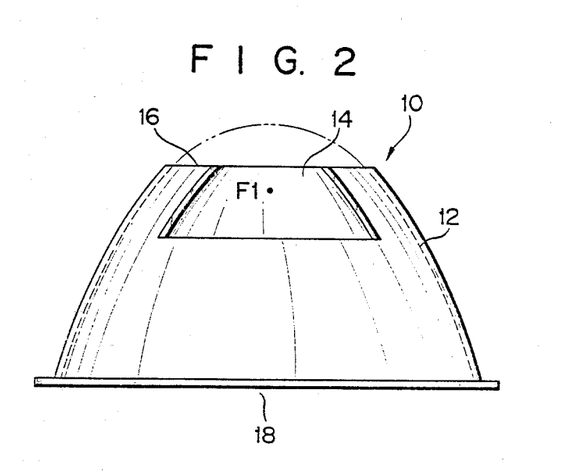
FIG. 2 shows a bottom view of the reflector shown in FIG. 1.

FIGS. 1 and 2 show a rear view and a bottom view, respectively, of first reflector 10 to be utilized for this marker light. A pair of reflectors 10 and 20 is used in a set. Reflector 10 comprises a reflection surface 12 which is an ellipsoid of revolution, an opening 17 at the vertex end, a light projecting opening 18 at the other end and an opening 14 to be used for replacing a light source. The reflection surface 12 has first focus F1 of an ellipse with a focal length of 1 cm. The vertex portion of the reflector 10 is provided with a cut-out 16 to face the vertex portion of another reflector. Cut-out 16 is made such that first focus F1 is located on the opening (18) side rather than on the cut-out (16) side. Cut-out 16 is made by cutting off the top portion of the reflector 10 perpendicular to the optical axis thereof The focus F1 is positioned at a point along the optical axis of the ellipsoid of revolution between the openings 17 and 18.

Figure 3:
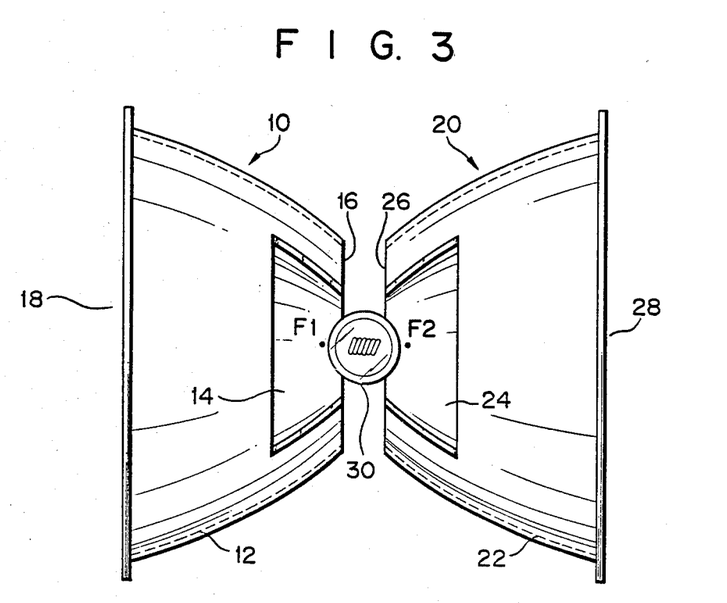
FIG. 3 shows the location of a pair of reflectors and a light source of this invention.

FIG. 3 shows a geometry of first reflector 10, second reflector 20 and a light source 30. The second reflector 20 comprises a reflection surface 22 which is an ellipsoid of revolution having 1 cm of the first focal length of the ellipse, an opening 24 and a cut-out 26. The first focus of second reflector 20 is shown as F2. Focus F1 of first reflector 10 is positioned closer to the light projecting opening 18 of the first reflector 10 than is the focus F2 of second reflector 20. Similarly, focus F2 of second reflector 20 is positioned closer to a light projecting opening 28 of the second reflector 20 than is the focus F1 of the first reflector. The focus F2 is positioned at a point along the optical axes of the ellipsoid of revolution between the cut-out 26 and the opening 28. The vertex ends of the reflectors are close to each other. Light source 30 is positioned such that the light center of the light source 30 is located between focus F1 and F2 of first and second reflectors 10 and 20. Light from the light source 30 is reflected from the first and second reflectors 10 and 20 and supplied through the light projecting openings 18 and 28.

Figure 4A:
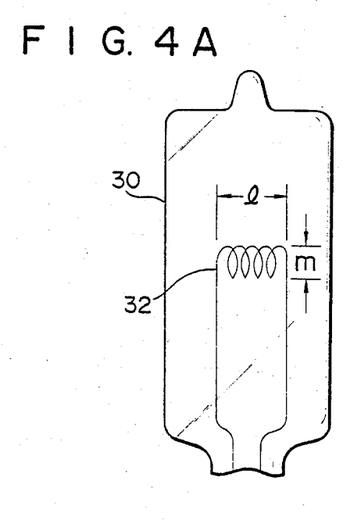
FIGS. 4A and 4B are schematic illustrations of a light source of this invention.
Figure 4B:
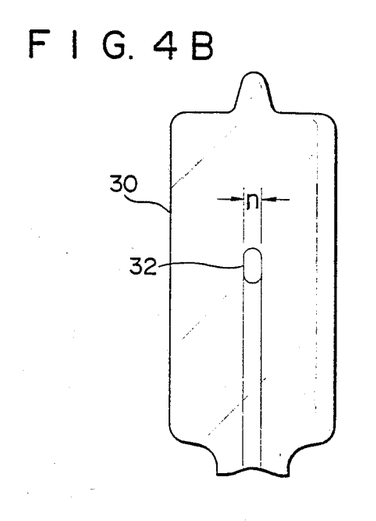

FIGS. 4A and 4B show light source 30 of this invention. Light source 30 has a filament 32 having 1 in length, m in width and n in thickness. Filament 32 is formed flat.

Figure 5:
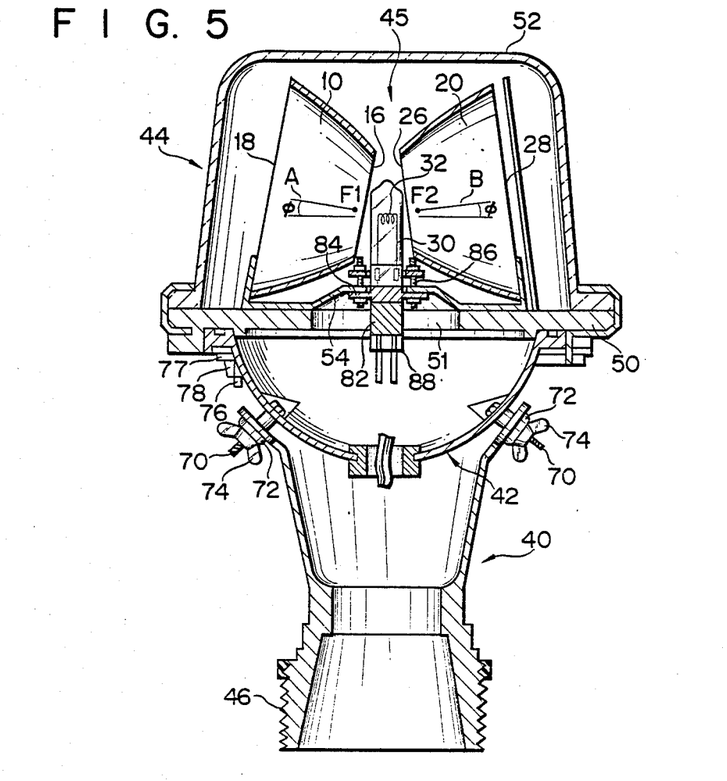
FIG. 5 shows a sectional view of this marker light in the preferred embodiment.

FIG. 5 shows a sectional view of this marker light. The marker light in this embodiment consists of a base member 40, an adjustable support 42 mounted on base member 40 by means of a screw 70, a washer 72 and a butterfly nut 74, a housing 44 housing an optical system 45 and fixed to support 42 by means of a screw 76, a washer 77 and a butterfly nut 78, and the optical system 45. For example, base member 40 is fixed to a pole (not shown) along a runway by means of a screw 46.

Location adjustment of support 42 in vertical direction is performed by moving screw 70 along a slit formed in base member 40. Location adjustment of support 42 in horizontal direction is performed by means of screw 46 of base member 40. Support 42 has only the function of setting the flux direction. Therefore, when inspection or replacement of housing 44 or optical system 45 needs to be done, only housing 44 may be removed from support 42. When the flux direction is already set by support 42, no adjustment of location of housing 44 is necessary.

Housing 44 comprises a base plate 50 having a through hole 51 and a cylindrical transparent cover 52 having an open end whereby transparent cover 52 is fixed to base plate 50.

Optical system 45 comprises a light source 30 and a pair of reflectors 10 and 20 facing light source 30 for projecting the radiated light from light source 30. Light source 30 is secured with a support plate 54 mounted on base plate 50.

Figure 6:
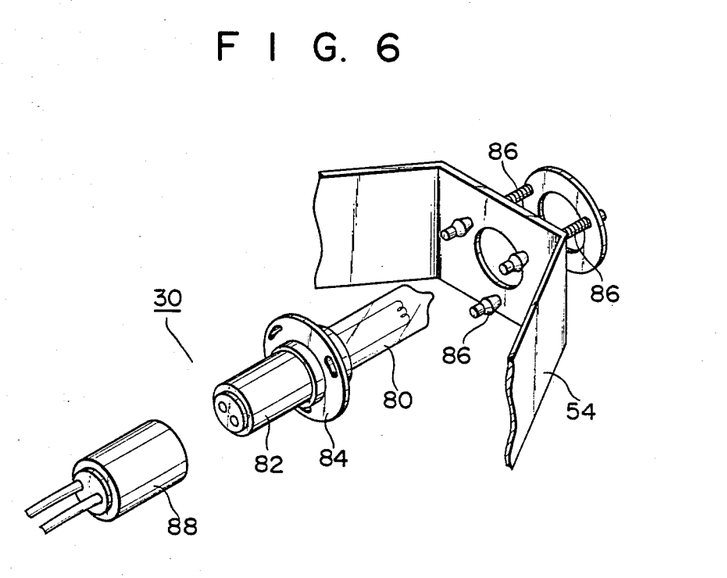
FIG. 6 shows an exploded perspective view of a light source, a support plate and a socket.

As shown in FIG. 6, light source 30 comprises a luminous portion 80, base portion 82 for supplying voltage to luminous portion 80, and a fixing member 84 for fixing light source 30 to support plate 54.

Fixing member 84 is fitted around the circumference of base portion 82 and secured to support plate 54 by means of screw means 86.

Voltage is supplied to base portion 82 through a socket 88. Socket 88 is readily removable. A pair of reflectors 10 and 20 is also fixed to support plate 54. Cover 52 may have transparent sections for passing light reflected from reflectors 10 and 20. Transparent sections are positioned to face the light projecting openings 18 and 28, respectively.

An angle between the plane perpendicular to the flat surface of filament 32 of light source 30 and the optical axis A of reflector 10 of the optical axis B of second reflector 20 is represented by $\phi$. Angle $\phi$ is less than 10 degrees. A flat surface of the flat filament 32 is parallel to a perpendicular plane and substantially parallel to the optical axes A and B of the first and second reflectors 10 and 20. The filament is installed such that the center of the flat surface thereof is located between focus F1 and F2 of first and second reflectors and provided along the optical axes of the first and second reflectors.

Figure 7:
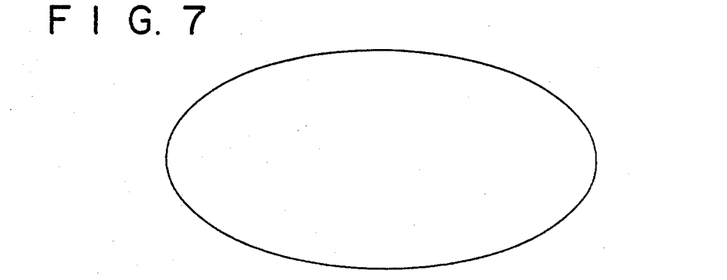
FIG. 7 shows a luminous distribution of this marker light in the preferred embodiment.

A marker light in FIG. 5 works as follows:

The radiated light from light source 30 is projected through first and second reflectors 10 and 20, providing a laterally-broadening, elliptic luminous distribution as in FIG. 7. Luminous intensity distribution in the horizontal direction in this luminous distribution range is represented by curve $\alpha 1$ in FIG. 8. The filament of a light source 30 has a length l of 3.5 mm, a width m of 3.0 mm and a thickness n of 1.2 mm, and it consumes 100 W.

Figure 8:
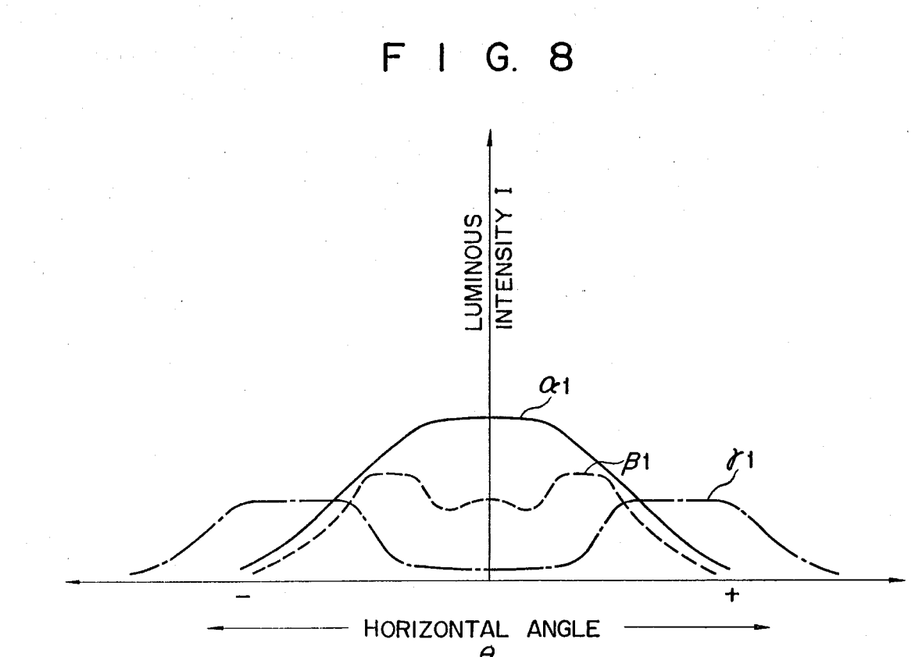
FIG. 8 shows a luminous intensity distribution of this marker light in the preferred embodiment.
Figure 9:
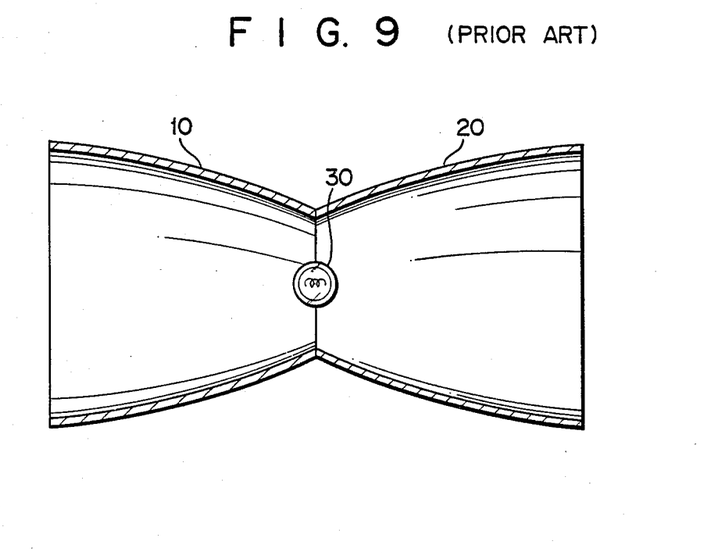
FIGS. 9 and 10 are schematic drawings showing the positions of the reflectors and light sources of the prior art.
Figure 10:
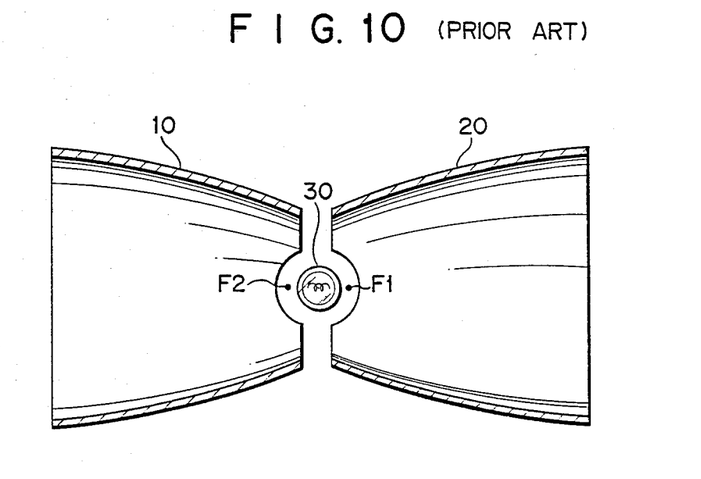

When focus F1 and focus F2 are located at the same point and a light source 30 is placed on that point as in FIG. 9, luminous intensity distribution is represented by curve $\beta 1$ in FIG. 8. When focus F1 of first reflector 10 is positioned closer to the projecting opening 28 of the second reflector 20 than is focus F2 of second reflector 20 as in FIG. 10, luminous intensity distribution is represented by curve $\gamma 1$ in FIG. 8. FIGS. 9 and 10 show a conventional marker light.

As shown in FIG. 8, this invention provides a laterally-broadening luminous distribution and a sufficient uniformity of illuminance. It was confirmed that the uniformity of illuminance can be improved even if another light source is used. This is because a filament 32 of a light source 30 is located outside of focus F1 and F2 of reflectors 10 and 20. The focus F1 is positioned at a point along one of the two optical axes of the ellipsoid of revolution between the opening at the vertex and the light projecting opening and the focus F2 at a point along the other optical axis of the ellipsoid of revolution. Laterally-broadening luminous distribution and uniformity of illuminance are obtained due to the flat filament 32 of light source 30. Another advantage of this embodiment is that it is possible to decrease the area of cut-outs 16 and 26 by locating a filament 32 outside of focus F1 and F2 of reflectors 10 and 20.

Figure 11:
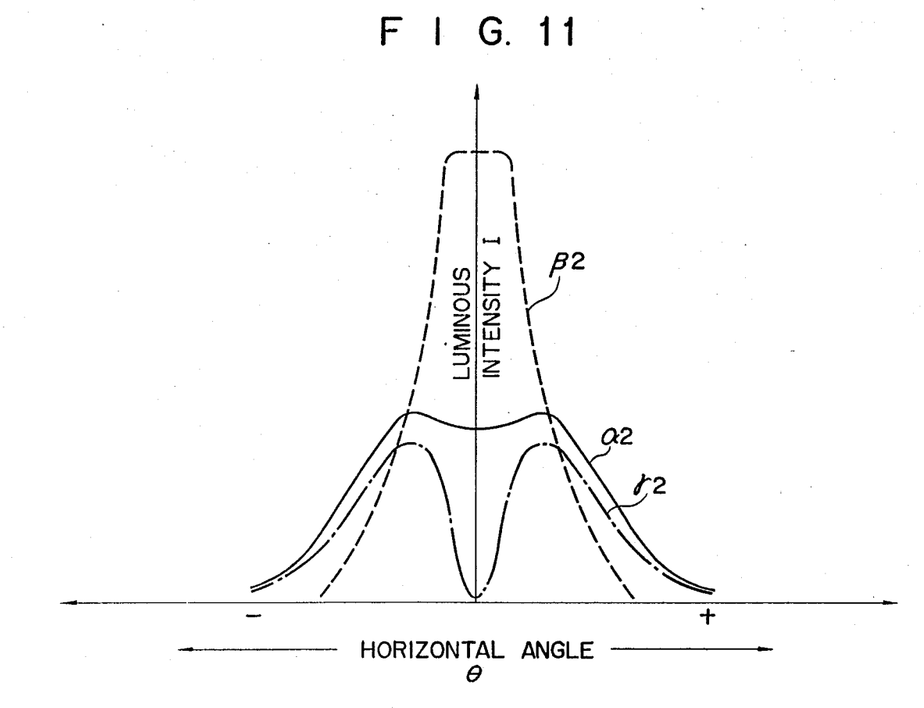
FIG. 11 shows a luminous intensity distribution of this marker light in another embodiment.

FIG. 11 shows a luminous intensity distribution when the reflection surface of a reflector is a paraboloid of revolution. In this case, a light source shown in FIGS. 4A and 4B is used. Curve $\alpha 2$ shows the characteristics of luminous intensity distribution when each focus is positioned forward of the light source as in FIG. 3. Curve $\beta 2$ shows the characteristics of luminous intensity distribution when each focus is positioned at the same point where the light source is installed as in FIG. 9. Curve $\gamma 2$ shows the characteristics of luminous intensity distribution when each focus is positioned in back of the light source as in FIG. 10. This marker light having the reflection surface of a paraboloid of revolution with each focus positioned forward of the light source also provides a laterally-broadening luminous distribution and a sufficient uniformity of illuminance as in the case of the ellipsoid of revolution.

The surface of the reflector is not restricted to an ellipsoid of revolution or a paraboloid of rotation. Any quadric of revolution is acceptable. It is acceptable that, in the embodiment above, an angle $\phi$ between the plane perpendicular to the flat surface of the filament 32 of the light source 30 and the optical axis A of first reflector 10 or the optical axis B of second reflector 20 is not more than 10 degrees, however, approx. 0 degree is desirable.

Figure 12:
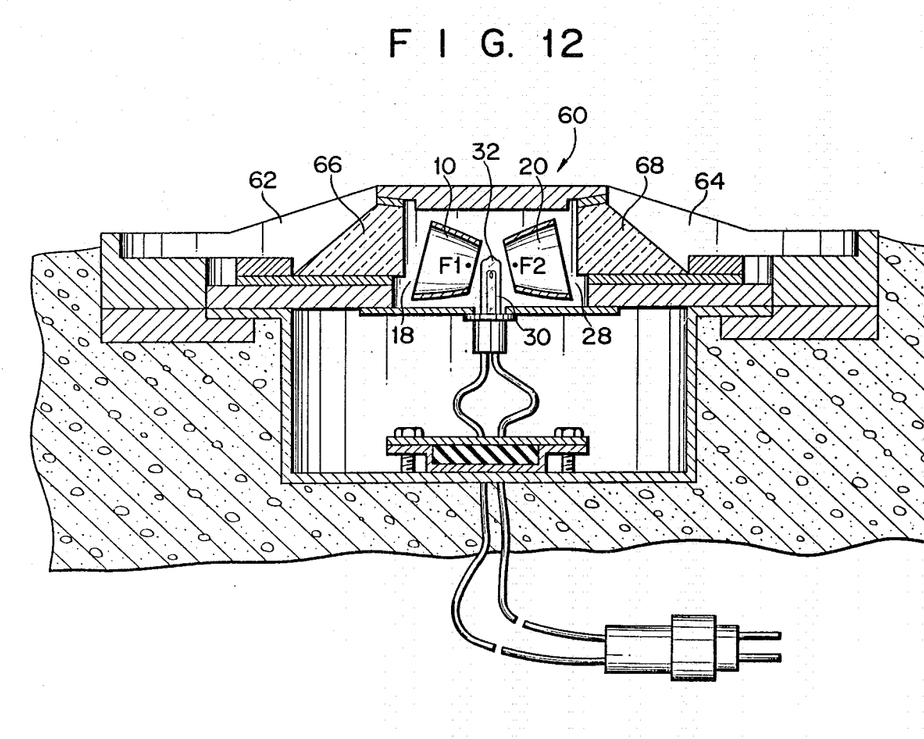
FIG. 12 shows a sectional view of a marker light in still another embodiment.

FIG. 12 shows another embodiment for this invention. This is a buried marker light. This marker light comprises a pair of reflectors 10 and 20 with a quadric of revolution, a light source 30, a housing 60 housing reflectors 10 and 20 and light source 30. Housing 60 is equipped with projecting windows 62 and 64 and prisms 66 and 68. In this embodiment, focus F1 of first reflector 10 is positioned closer to a light projecting opening of the first reflector than is the focus F2 of second reflector 20. Light source 30 is positioned such that the center of the filament 32 is located between focus F1 and F2. This buried marker light provides a laterally-broadening luminous distribution, a sufficient luminous intensity and a superior uniformity of illuminance. This marker light meets the specification for the buried runway center light (that requires not less than 5,000 cd of luminous intensity in the oval range ±5° in horizontal and 0° to 9° in vertical).

Besides the use as shown in the embodiment above, this invention is applicable to other uses because of its flexibility in structure. For example, the cut-outs of first and second reflectors may be connected and united into one. This results in efficient use of the radiated light with only a small disadvantage in manufacturing. A different type of surface for first and second reflector e.g. an ellipsoid of revolution for first reflector and a paraboloid of revolution for second reflector, is acceptable. First and second reflectors that are different in configuration and in dimensions are also acceptable. These two reflectors may be positioned with a certain angle kept between two directions of projection instead of 180°.

Figure 13A:
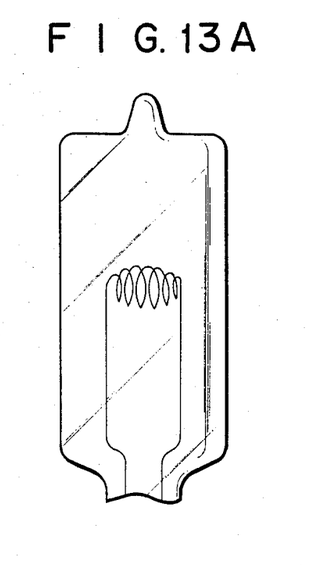
FIGS. 13A and 13B schematically illustrate another light source used for this invention.
Figure 13B:
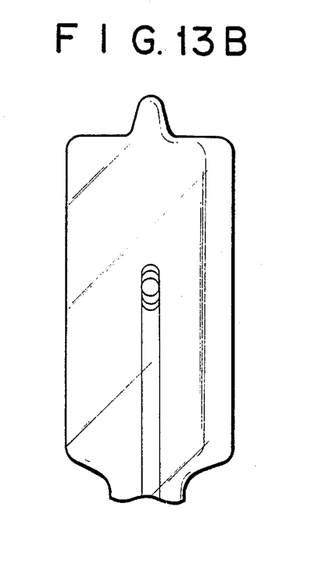
Figure 14A:
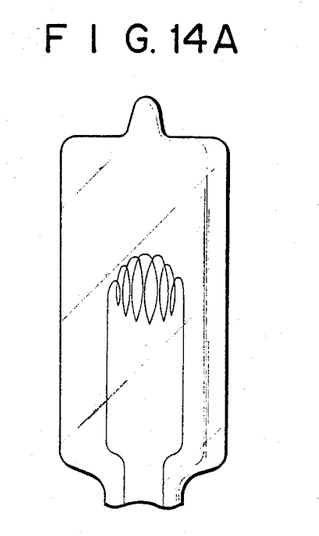
FIGS. 14A and 14B schematically illustrate another light source used for this invention.
Figure 14B:
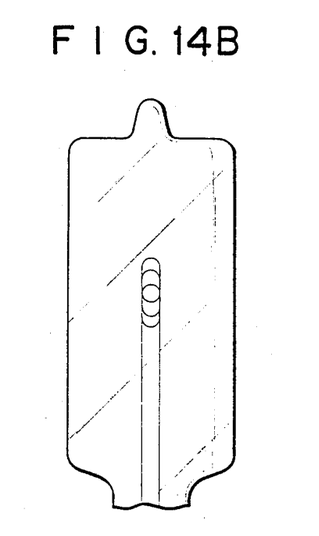

Not only those as in FIGS. 4A and 4B but an ellipse as in FIGS. 13A and 13B or a circle as in FIGS. 14A and 14B is acceptable for the filament configuration.

Figure 15:
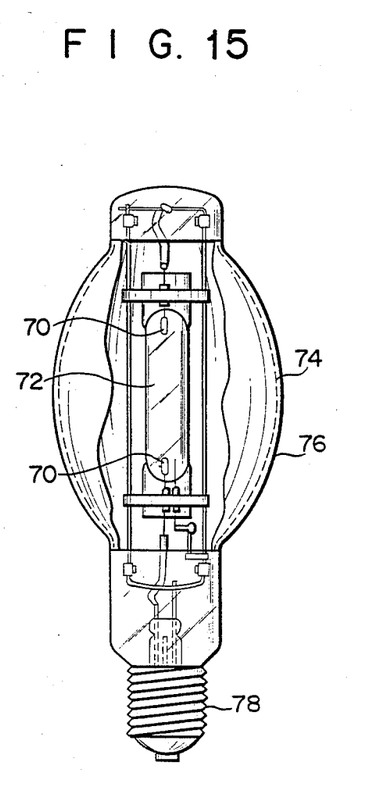
FIG. 15 schematically illustrates a high intensity discharge lamp to be used for this invention.

Besides an incandescent lamp, HID lamp (high intensity discharge) employing a mercury lamp as in FIG. 15 is acceptable as a light source. HID lamp in FIG. 15 comprises a luminous tube 72 having main electrodes at both ends, an external bulb 76 housing luminous tube 72, and with the inner wall coated with fluorescent material 74 and a base 78.

Furthermore, a cut-out need not be made by cutting off the vertex portion perpendicular to the optical axis. It may be cut off maintaining a certain angle against the optical axis as required.

What we claim is:

1. A marker light comprising:
   first and second reflectors each having a focus, a reflection surface which is a quadric of revolution, a small opening at the vertex and, a large opening for projecting light, through a side opposite said vertex; said focus being positioned at a point along an optical aixs of said quadric of revolution and between said small and large openings, the small openings of said first and second reflectors facing each other and said focuses being separated from each other;
   an incandescent lamp, having a flat filament provided along said optical axes of the first and second reflectors for emitting light; said filament being located outside the reflectors and lying between a pair of planes defined along said small openings at the vertex which are parallel to each other and are perpendicular to a plane parallel to said optical axes of said first and second reflectors, and the light from said light source being reflected from the first and second reflectors and supplied through the large openings of the first and second reflectors; and
   a housing for the first and second reflectors and the light source, and having a first transparent section for passing light reflected from the first reflector and a second transparent section for passing light reflected from the second reflector; said first and second transparent sections being positioned to face the light projecting openings of the first and second reflectors, respectively.

2. A marker light according to claim 1, wherein the reflection surface of said first and second reflectors is an ellipsoid of revolution.

3. A marker light according to claim 1, wherein the reflection surface of said first and second reflectors is a paraboloid of revolution.

4. A marker light according to claim 1, wherein said light produces an output of uniform illuminance distribution and high luminous intensity.

5. A marker light according to any one of claims 1 to 3, wherein said light source is a high intensity discharge lamp.

6. A marker light according to any one of claims 1 to 3, wherein an angle between a plane perpendicular to said flat surface of said filament and the optical axis of said first and second reflectors is less than 10 degrees.

7. A marker light according to claim 6, wherein said flat surface of the filament is rectangular.

8. A marker light according to claim 6, wherein said flat surface of the filament is elliptic.

9. A marker light according to claim 6, wherein said flat surface of the filament is circular.

* * * * *